United States Patent Office 3,278,363
Patented Oct. 11, 1966

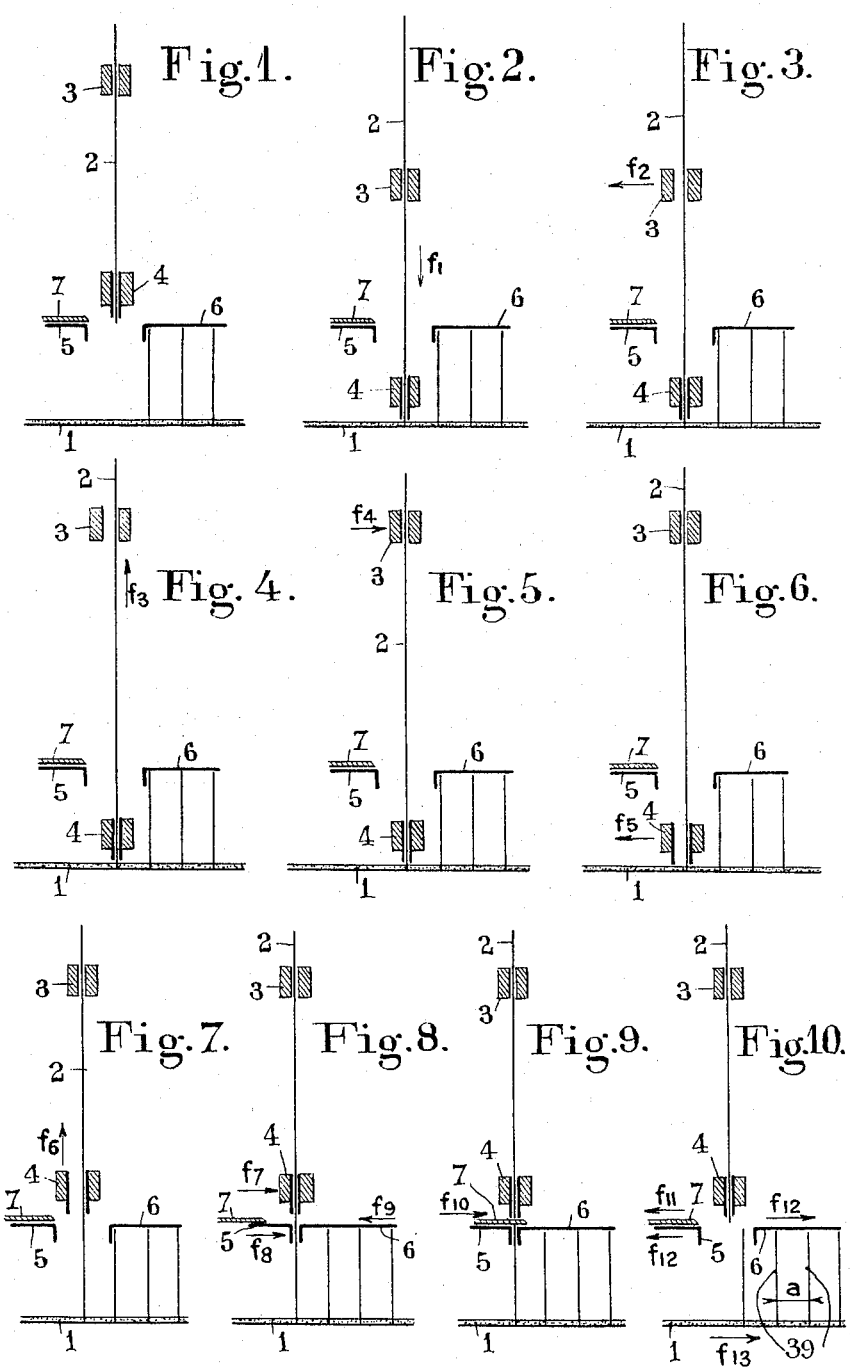

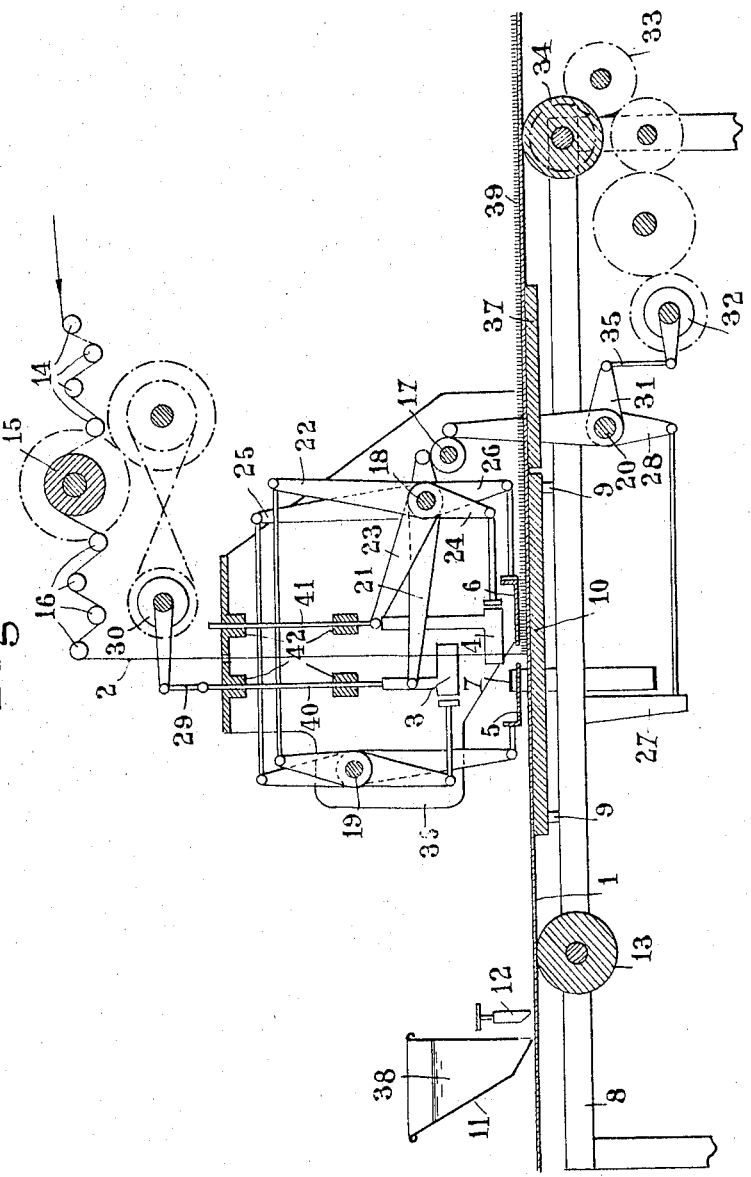

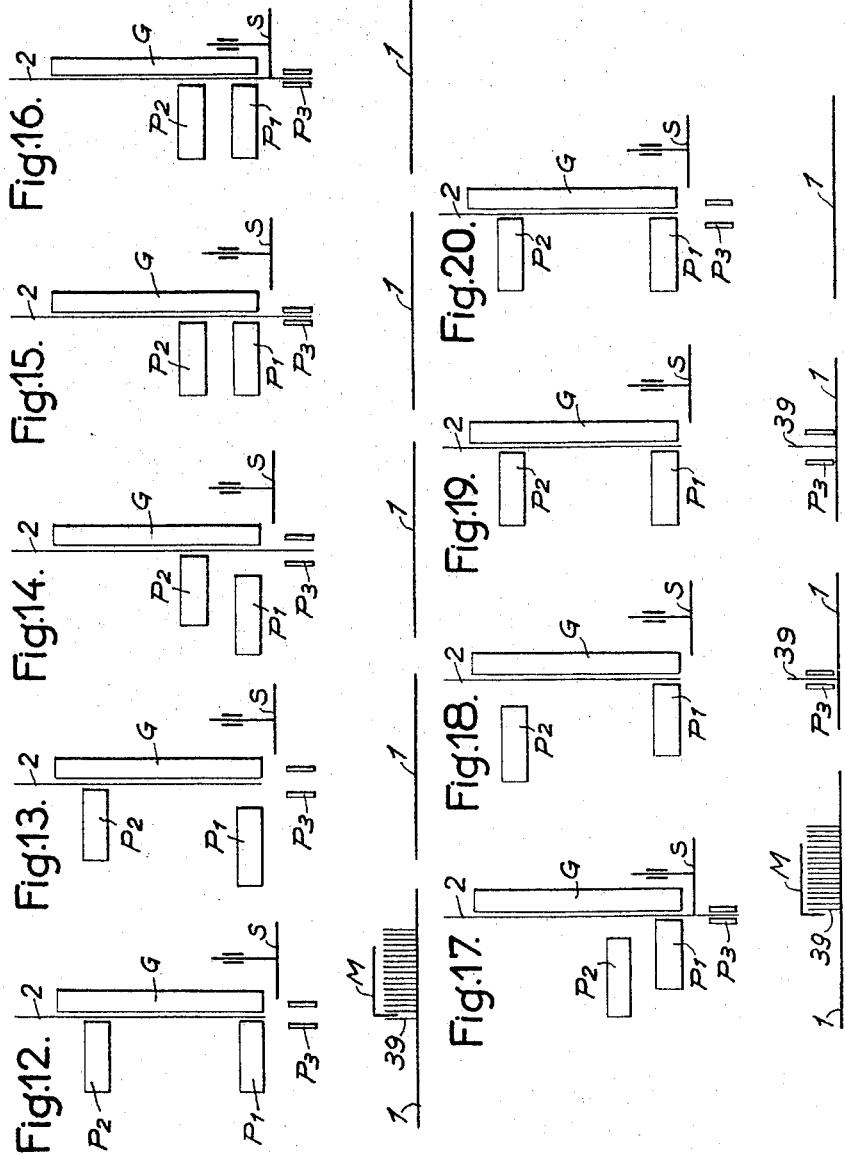

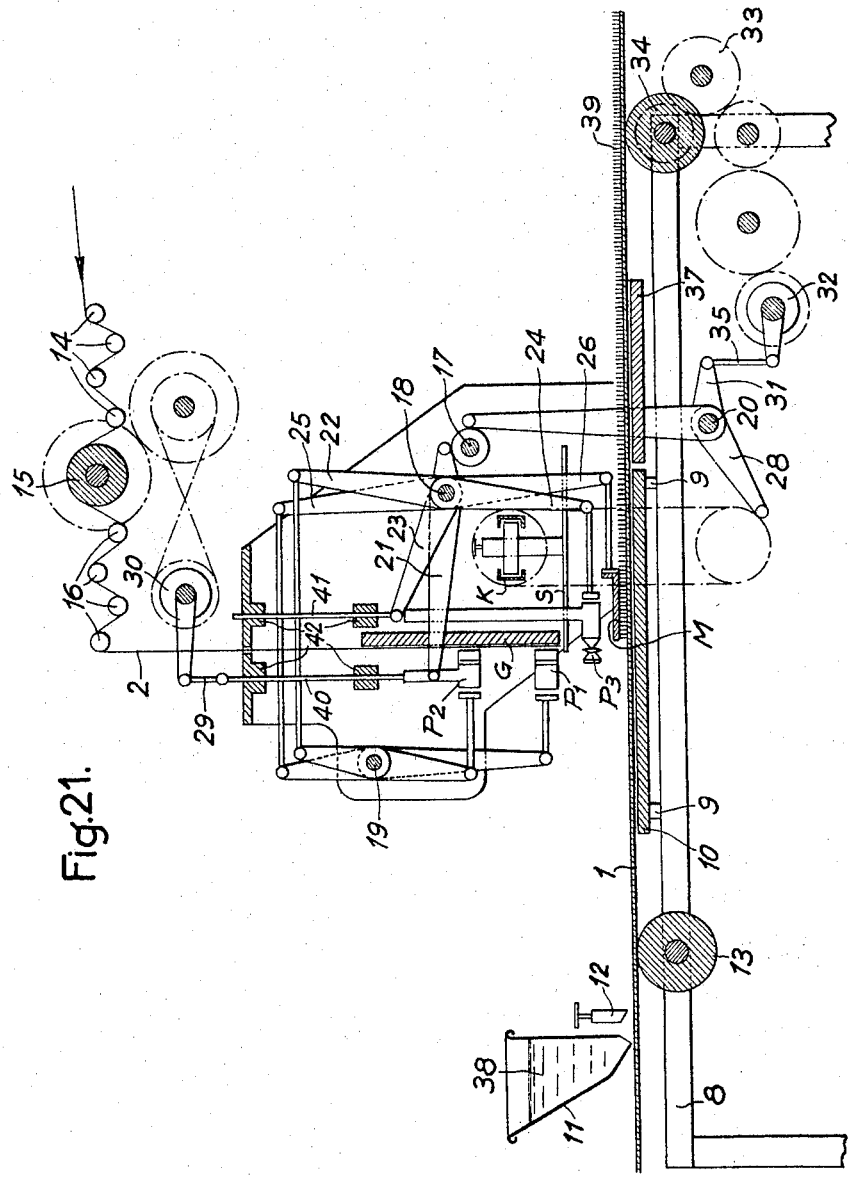

3,278,363
APPARATUS FOR CONTINUOUSLY MANUFACTURING PILE ARTICLES
Pierre Couquet, Lavelanet, France
Filed Dec. 17, 1963, Ser. No. 331,156
Claims priority, application France, Dec. 17, 1962,
918,823, Patent 1,352,193; Nov. 25, 1963, 954,855,
Patent 1,352,193
4 Claims. (Cl. 156—435)

The present invention relates to the manufacture of pile articles selected from the group consisting of carpets and velvets, and has specific reference to an apparatus for manufacturing such articles by a method which consists essentially in ingrafting yarns by one of their ends into a layer of adhesive resin material before this material has set, and subsequently causing this layer to set in a manner known per se.

The ingrafting operation is necessarily carried out when the adhesive resin material is still in the soft or liquid state and the thus ingrafted yarns are anchored by either gelling the resin or evaporating organic solvents or water contained therein, when the resin is used in the form of an emulsion or solution.

Of course, the ingrafting step may be carried out with the yarns presented separately or in the form of a plurality of aligned strands of yarn.

The adhesive resin material may consist of any known and suitable substance having these properties, notably thermosetting or thermoplastic resins such as polyvinyl chloride, polyethylene, epoxides, etc. It may be placed on an adherent or non-adherent carrier, which is left or removed upon completion of the resin setting process. Of course, this carrier has the shape and dimensions of the nappy or pile article, whether a carpet or a piece of velvet, to be obtained.

Typical examples of provisional non-adherent carriers are sheets of silicon paper, aluminum sheets, polychlorofluoroethylene sheets, etc. The layer of resin material separates very easily from these carriers subsequent to the ingrafting of the yarns therein and to the setting of this layer. The finished nappy or pile article consists in this case of a sheet of set resin in which the yarns are ingrafted vertically.

As suitable adherent supports remaining associated with the set resin material to constitute the base or carrier of the finished article, fabric and woven materials of all kinds, knitted fabrics, paper and like supports may be used.

The method of this invention may be carried out as a continuous process or batchwise, and in the case of a continuous process a plurality of aligned strands of yarn is lowered vertically until it penetrates into a horizontal strip of adhesive resin substance still in the soft condition which underlies said sheet, has the width consistent with that of the finished article contemplated and is carried by a support; then the movement of the aligned strands of yarn is stopped and the strands are cut at the proper height corresponding to the desired length of the velvet pile, whereafter said strip is caused to be fed while remaining beneath said sheet of yarns to the desired spacing or pitch between the successive rows of pile of the article, whereafter the strip is stopped and the above-described cycle of operations is repeated, the strip setting in a manner known per se along its path beyond the place where the sheet of yarns is delivered thereto.

A preferred device according to this invention for the continuous manufacture of nappy articles selected from the group consisting of carpets and velvets from a strip or web of adhesive resin substance in its non-set of soft condition which is carried by a support and from a vertical sheet of yarns, is characterized in that it comprises a bed adjustable vertically above a frame structure, conventional intermittent-feed means for causing said strip or web to slide on said bed, an upper clamp and a lower clamp in vertical alignment with each other above said bed for clamping the lower portion of the aligned strands of yarn and receiving during the periodical stoppage of said strip or web an intermittent alternating downward movement causing the aligned strands of yarn to contact said strip, an opening movement, an upward movement along the stationary strands, and a subsequent closing movement on said strand, said two clamps effecting these last-named three movements in succession, firstly the upper clamp and then the lower clamp, jaws for clamping the stationary strands which are disposed above said bed at a distance equal to the height of the pile of the desired nappy article, a device for cutting the strands of yarns which is arranged just above said jaws, conventional means for operating according to a predetermined sequence said clamps, jaws, cutting device and means for periodically feeding said strip, and a heating plate constituting the extension of said horizontal bed.

This invention is also concerned with carpets and velvets manufactured witth the apparatus according to the method set forth hereinabove.

In order to afford a clearer understanding of this invention and of the manner in which the same may be carried out in practice, reference will now be made to the accompanying drawings in which:

FIGURES 1 to 10 inclusive are diagrammatic sectional views showing the apparatus and sequence of steps constituting the method of this invention in case of a continuous production cycle;

FIGURES 12 to 20 inclusive are corresponding figures of a different form of embodiment of apparatus according to the method of this invention; and FIGURES 11 and 21 are diagrammatic vertical longitudinal sections showing typical devices suitable for carrying out the continuous manufacturing process of this invention.

In the specific example illustrated in the drawings a carpet is produced which has a base layer consisting of polyvinyl chloride 1 supported temporarily by a sheet of non-adherent material (not shown in the drawings) which is to be removed upon completion of the article. The polyvinyl chloride used to this end is in the non-set state, i.e., having a viscosity still sufficient to permit the ingrafting and anchoring or embedding therein of a plurality of aligned strands of yarn 2 used for the manufacture of the carpet.

The polyvinyl chloride strip or web 1 in the non-gelled state is disposed horizontally beneath the strands of yarn 2 extending vertically.

The aligned strands 2 are clamped in a so-called upper clamp 3 and in a so-called lower clamp 4 beneath which the ends of the strands of yarn project by a few millimeters, for example about 3 mm., so that the yarn ends penetrate into the plastic strip or web 1 without any risk of soiling the lower end of clamp 4 with this substance (FIG. 1). Jaws 5 and 6 disposed horizontally above the strip 1 at a relative spacing corresponding to the desired pile height of the finished velvet or carpet are in their open position, i.e. spaced from the strands of yarn 2, and a cutting device adapted to cut the strands, for example a saw-band 7, located just behind the left-hand jaw 5, is also somewhat spaced from the strands of yarn 2.

By means of a suitable and known device the strands of yarn 2 and the clamps 3 and 4 retaining the strands are lowered vertically in the direction of the arrow $f_1$ until the yarn ends of this sheet are embedded in the strip 1 (FIG. 2). The opening of jaws 5 and 6 and the remote position of the cutting blade 7 permitted the passage of the lower clamp 4. The clamps 3 and 4 tensioning the lower portion of the strands of yarn and guiding same during its downward movement serve the purpose of engaging the strands of yarn exactly in the desired direction through the strip 1.

The clamp 3 opens in the direction $f_2$ (FIG. 3) while all the other components remain in the same position as shown in FIG. 2, whereafter it rises as shown by the arrow $f_3$ through a distance equal to the height of the carpet pile (tuft) as shown in FIG. 4, and is subsequently closed in the direction $f_4$ in this upper position (see FIG. 5).

Then the strands of yarn 2 are still clamped in its lower region on the one hand by the clamp 3 and on the other hand by the end of the yarn embedded in the plastic strip 1, the lower clamp 4 opening in turn in the direction $f_5$ (FIG. 6) and rising in the direction $f_6$ by a height equal to that of the carpet naps (FIG. 7) before re-closing in the direction $f_7$, while the jaws 5 and 6 are pressed against each other in the directions $f_8$ and $f_9$ to clamp the strand of yarn 2 beneath the lower clamp 4 (FIG. 8).

As the strands of yarn 2 are firmly held by the clamps 3 and 4 and jaws 5 and 6, and along a relatively reduced height between these jaws and the clamp 4, the saw band 7 is moved forwards in the direction $f_{10}$ to cut the strands of yarn 2 between the jaws 5, 6 and clamps 4 (see FIG. 9). Upon completion of this step, the saw band 7 is moved away in the direction $f_{11}$, the jaws 5 and 6 are moved away from each other (arrow $f_{12}$) to their inoperative position, and meanwhile the strip 1 is fed in the direction $f_{13}$ by a length equal to the predetermined gap or pitch $a$ between the successive rows of carpet pile yarns (FIG. 10).

Thus, the conditions obtaining in FIG. 1 are restored and the complete cycle described hereinabove is resumed, each cycle corresponding to the embedding of another row of pile or yarns on the strip or web 1 constituting the carpet base.

It is thus clear that the continuous method of this invention consists in feeding intermittently the strip 1 horizontally and the strands of yarn 2 vertically, these movements taking place alternatively, the strip moving when the strands are stationary and vice-versa.

Beyond the location where the yarns are embedded into the strip 1 this strip moves over heating elements adapted to gel the polyvinyl chloride or to evaporate the water or organic solvent (or solvents) likely to be contained in another resin substance adapted to be substituted for the vinyl polychloride.

The height of the carpet pile may be adjusted without difficulty by modifying the relative spacing between the jaws 5, 6 and the cutting device 7, on the one hand, and the strip 1, on the other hand.

FIGURE 11 illustrates a specific form of embodiment of an apparatus for carrying out the continuous process of this invention.

This apparatus comprises a frame structure 8 supporting by means of vertically adjustable legs 9 a bed 10 on which the strip or web 1, for example a polyvinyl chloride strip, is adapted to slide. This strip may be lined if desired with a carrier sheet of non-adherent paper to be removed upon completion of the carpet.

The polyvinyl chloride 38 is delivered from a reservoir 11, a doctor blade 12 being associated with the reservoir outlet in order to spread the resin substance uniformly in the form of a layer of regular thickness over the provisional paper carrier.

The strip or web 1 is supported and guided between the reservoir 11 and the bed 10 by means of a guide roll 13.

The aligned strands of yarn 2 which is to constitute the rows of pile 39 of the carpet is delivered from a yarn-beam or simply from spools (not shown) and passes over a first series of healds 14 for tensioning the strands and directing them with the necessary parallelism toward a feed roll 15 driven in a manner to be set forth presently, and then over another series of healds 16.

The strands of yarn is subsequently directed downwardly between the clamps 3 and 4 and also between the jaws 5 and 6 so as to be clamped alternatively or simultaneously according to the steps of the method set forth hereinabove.

The control and actuation of the machine will now be described in detail with reference to FIG. 11.

A main electromotor (not shown) drives a camshaft 17 through a reducing gearing (also not shown). This camshaft 17 shown in diagrammatic form only carries all the cam members necessary for controlling the movements of the various movable members of the machine. This motion is transmitted to these members through a plurality of rocker arms pivoted for example about three stationary shafts 18, 19 and 20. In practice these three stationary shafts, shown separately in the figure for the sake of clarity, are combined into a single shaft on which all the rocker arms are mounted independently. The vertical reciprocating motion of the upper clamp 3 is controlled by means of rocker 21, and the opening of this upper clamp is controlled by means of rocker 22. The corresponding rockers acting upon the lower clamp 4 are designated by the reference numerals 23 and 24. The jaws 5, 6 are controlled by means of rockers 25, 26 and finally the saw band 7 mounted on a movable bracket 27 shown only in diagrammatic form is actuated by means of rocker 28.

Another electromotor, not shown, drives intermittently the saw band with the proper timing.

The aligned strands of yarn 2 are pulled downwards by the clamps 3 and 4. The feed roll 15 may be dispensed with theoretically, but it has been found in practice that this roll is necessary in order to keep the sheet under a constant tension. This roll is rotatably driven as a consequence of the downward movement of clamp 3 through the medium of a rod 29 operating a pawl and ratchet device 30. Thus, if, for instance, the manufacture of a carpet whose pile is 0.4″ high is contemplated, each time the camshaft 17 of the machine completes one revolution and therefore each time a row of pile is embedded in the soft plastic layer 1, the clamp 3 is lowered by 0.4″ and carries along the rod 29 which, through the kinematic yarn feed control motion causes the outer periphery of feed roll 15 to rotate through this linear distance (0.4″). This kinematic yarn feed control motion comprises the pawl and ratchet device 30 so designed that it allows the ratchet wheel to rotate only when the clamp 3 is moving downwards, and the rod and arm assembly 29 as well as a train of gears and a transmission belt shown in chain-dotted lines, this assembly permitting a circumferential displacement of the feed roll 15 which is equal to the vertical linear displacement of clamp 3. Therefore, the feed roll 15 is rotatably driven intermittently under the control of the downward movement of clamp 3. The advantage resulting from this coupling is that it is not necessary to adjust the velocity of rotation of roll 15 when the amplitude of the movement of translation of clamp 3 is altered, as a consequence of a desired modification of the height of the carpet pile.

Rods 40 and 41 connected to the clamps 3 and 4 are movable in guide means 42 for imparting a rectilinear motion to these clamps.

The feed of strip or web 1 is controlled by means of a special cam carried by the shaft 17. This cam acts upon a rocker 31 carried by the secondary fixed shaft 20, this rocker actuating in turn through an arm and rod transmission 35 a pawl and ratchet device 32 adapted to control the intermittent rotation of a train of gears shown in chain-dotted lines and wherein the last toothed wheel 33 drives the strip feed roll 34 which is the carpet feed roll. Under these conditions, the kinematic motion driving the carpet comprises the pawl and ratchet device 32 and the train of gears associated therewith. The wheel 33 acts as a change gear whereby the carpet feed rate and therefore the density of the rows of embedded yarns 39 may be modified at will.

The machine further comprises a drying plate or bed 37, which may be preferably a heating bed to promote the gelling of the plastic base of the carpet, and lateral protection plates 36.

By altering the height of legs 9 supporting the bed 10 the distance between this bed and the jaws 5, 6 above which the saw band 7 is operated may be varied at will to alter the height of the rows of pile 39 of the carpet.

The cams carried by the main or cam shaft 17 are arranged and designed in such a way that the rockers of the machine cause in succession the downward movement toward the strip 1 of the closed clamps 3, 4 holding the strands of yarn and pulling same downwards until their lower tips engage the strip 1; the opening of said clamps, their upward movement along the strands of yarn by a height equal to the preset height of the carpet pile, the reclosing of said clamps on the yarns in this upper position the two clamps effecting these last three movements in succession, then the clamping of the strands of yarn 2 by means of the jaws 5 and 6 and the forward movement of the saw band 7 toward the strands, the band being then driven by its motor by means of a relay of a type known per se controlled by means adapted to start this motor periodically, the opening of said jaws 5, 6 subsequent to the cutting of the strands of yarn by the saw blade, the retracting of the saw band 7 and the feeding of strip 1, along the bed 10 through a distance equal to the desired relative spacing or pitch 39 between two successive rows 39 of carpet pile, the cycle of operations just described being resumed continuously.

Of course, various details and relative arrangements of parts may be modified in practice with respect both to the method and to the device for carrying out this method according to the present invention, without departing from the spirit and scope of the invention.

Thus, as shown diagrammatically in FIGS. 12 to 20 inclusive, the method may be modified and the device illustrated diagrammatically in FIG. 21 permits the practical actuation of this alternate method, as compared with the device of FIG. 11 designed for implementing the method referred to in FIGS. 1 to 10 of the drawings.

In this alternate embodiment each row of carpet or velvet pile 39 is cut from the strands of yarn 2 before the strands contact the horizontal strip 1 of non-set adhesive resin substance, and the strand ends are subsequently lowered onto this strip. In this case the upper and lower clamps 3, 4 are replaced with upper and lower clamps $P_2$, $P_1$ respectively, adapted to press the strands of yarn 2 against the vertical guide face G, or to move away therefrom, clamp $P_2$ being furthermore adapted to move vertically; on the other hand, the jaws 5, 6 are replaced with a yarn guide $P_3$ movable vertically between the strip 1 and the saw blade S carried by a support K and substituted for the saw band 7 carried by the bracket 27 of the preceding example, this saw blade S consisting of a circular saw rotating about a vertical axis and driven horizontally to a position of engagement with the strands and to which a horizontal movement of translation is imparted periodically from one to the other side of the device in a direction parallel to the strands of yarn 2, and then backwards to said one side; finally, a compressing member M adapted to be raised and lowered above the tops of the last row of pile 39 embedded in the strip 1, is provided.

All the other component elements of the device illustrated in FIG. 21 are the same as those of the device of FIG. 11 and therefore the same reference numerals are used to designate them; besides, the operation of these other component elements is the same as that of the corresponding elements of the first form of embodiment disclosed hereinabove. Thus, the rocker 23 controls the vertical movement and rocker 24 the opening of the yarn guide $P_3$; rocker 21 controls the vertical movement and rocker 22 the opening of the upper clamp $P_2$; rocker 25 controls the opening of the lower clamp $P_1$ and rocker 26 the movement of the compressing member M, the rocker 28 controlling on the other hand the circular saw S, rocker 31 the feed roll associated with the strip or web 1, and rocker 29 the feed roll 15 associated with the sheet of yarns 2.

The range of steps performed by this modified device is as follows:

The device is initially in the condition illustrated diagrammatically in FIG. 12; a row of pile 39 has just been embedded in the strip 1; $P_1$ is closed, $P_2$ is in its upper position and closed; $P_3$ is in its upper and open position; M is in its lower position and the sheet of yarns 2 is clamped against the guide face member G.

(1) $P_1$ is moved to release the strands of yarn 2;
(2) $P_2$ is lowered and carries along the strand of yarn which slips along G and penetrates into $P_3$ (FIG. 14);
(3) $P_1$ and $P_3$ are closed (FIG. 15);
(4) S is moved forwards and begins its movement of lateral horizontal translation to cut the strands of yarn (FIG. 16);
(5) S continues it movement. Meanwhile M is raised, strip 1 is fed to the extent corresponding to the desired relative spacing or pitch between adjacent rows of pile 39 of the carpet, M is then lowered to protect the tips of the embedded yarns (FIG. 17);
(6) $P_3$ is lowered and the lower ends of the yarns clamped thereby are embedded in the strip 1; $P_2$ is moved back to its upper position (FIG. 18);
(7) $P_3$ is opened and $P_2$ is closed again (FIG. 19);
(8) $P_3$ moves back to its upper position (FIG. 20).

The device is restored to its initial position (FIG. 12) and the cycle is resumed.

What I claim is:

1. Apparatus for manufacturing as a continuous process pile articles from a strip of non-set adhesive resin substance carried by a support and from a plurality of vertically aligned strands of yarn which comprises a frame structure, a horizontal bed adjustable vertically in relation to said frame structure, feeding means for feeding said strip periodically causing said strip to slip along said bed, an upper clamp and a lower clamp disposed one above the other and above said bed, said clamps clamping the lower portion of said strands and receiving, during the periodic stoppages of said strip periodic alternating downward movement, timed actuating means for imparting a periodic alternating movement involving the driving of said strands downwardly to a position whereby their ends engage in said strip, the opening of said clamps, the raising of said clamps along the stationary strands, and the reclosing of said clamps on said strands, said two clamps accomplishing those last three movements in succession, the upper clamp operating first and then the lower clamp, jaws for clamping said strands while the strands are stationarily disposed, said jaws being disposed above said bed at a distance therefrom corresponding to the desired height of the pile of the article, a cutting device disposed just above said jaws for cutting said strands to form the pile of said article, and a heating table constituting an extension of said horizontal bed.

2. A device as set forth in claim 1, wherein said timed actuating means comprise a camshaft, stationary auxiliary shafts and rockers pivotally mounted on said auxiliary shafts, driven from the cams carried by said camshaft and connected mechanically to said upper clamp, lower clamp, jaws, cutting device and periodic strip feed means.

3. Apparatus for manufacturing as a continuous process pile articles, from a strip of non-set adhesive resin substance carried by a support and from a plurality of vertically aligned strands of yarn, which comprises a frame structure, a horizontal bed adjustable vertically on said frame structure, feeding means for periodically feeding said strip causing said strip to slip along said bed, a fixed vertical plate for guiding and supporting said strands, an upper clamp and a lower clamp disposed one above the other above said bed and cooperating with said fixed plate for clamping said strands, said upper clamp being movable vertically, a yarn guide located beneath said lower clamp pinching the lower end of said strands and moving vertically between said lower clamp and said strip, a cutting device disposed between said lower clamp and said yarn guide for cutting said strands to form the pile of said article, a movable compressing member situated above the tops of the preceding rows of pile embedded in said strip, timed means for actuating said clamps, yarn guide, cutting device, compressing member and periodic strip feed means, and a heating table constituting an extension of said horizontal bed.

4. A device as set forth in claim 3, wherein said timed actuating means comprise a camshaft, auxiliary fixed shafts and rockers pivotally mounted on said auxiliary shafts, actuated by the cams of said camshaft and connected mechanically to said upper clamp, said lower clamp, said yarn guide, said cutting device, said compressing member and said periodic strip feed means.

References Cited by the Examiner
UNITED STATES PATENTS

| | | | |
|---|---|---|---|
| 2,358,368 | 9/1944 | Victor | 156—72 |
| 2,787,571 | 4/1957 | Miller | 156—72 |
| 2,788,835 | 4/1957 | Brookes et al. | 156—72 |
| 3,041,707 | 7/1962 | Perri | 161—67 |
| 3,074,835 | 1/1963 | Gordon | 161—67 |
| 3,142,611 | 7/1964 | Mills | 156—72 X |

EARL M. BERGERT, *Primary Examiner.*

HAROLD ANSHER, *Examiner.*

A. J. SMEDEROVAC, *Assistant Examiner.*